United States Patent [19]

Loew

[11] 4,367,334
[45] Jan. 4, 1983

[54] BORONTETRAFLUORIDE SALTS OF BASIC OXAZINE DYES

[75] Inventor: Peter Loew, Münchenstein, Switzerland

[73] Assignee: Ciba-Geigy Corporation, Ardsley, N.Y.

[21] Appl. No.: 330,747

[22] Filed: Dec. 14, 1981

[30] Foreign Application Priority Data

Dec. 24, 1980 [CH] Switzerland .................. 9574/80

[51] Int. Cl.³ .......................................... C07D 265/38
[52] U.S. Cl. .................................................. 544/103
[58] Field of Search .......................................... 544/103

[56] References Cited

FOREIGN PATENT DOCUMENTS 751150 6/1956 United Kingdom .

*Primary Examiner*—Robert W. Ramsuer

*Attorney, Agent, or Firm*—Luther A. R. Hall

[57] ABSTRACT

The invention relates to dye salts of the formula

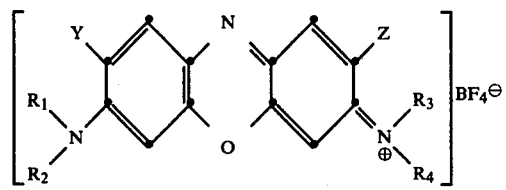

wherein $R_1$ and $R_4$ are hydrogen or alkyl, $R_2$ and $R_3$ are hydrogen, alkyl, aralkyl or aryl, and Y and Z are hydrogen, halogen, alkyl, alkoxy or aryloxy. These dye salts are most suitable for spin-dyeing acrylonitrile. Pure blue transparent fibres having excellent fastness properties are obtained.

5 Claims, No Drawings

BORONTETRAFLUORIDE SALTS OF BASIC OXAZINE DYES

It is known that the salts of basic oxazine dyes, for example the chlorides, sulfates, phosphates, acetates or benzoates, are most suitable for dyeing polyacrylonitrile from an aqueous bath (see e.g. German Auslegeschrift No. 1 031 272). However, the use of these salts for spin dyeing polyacrylonitrile imposes considerable disadvantages.

It has been found that the tetrafluoroborates of cationic oxazine dyes of the formula

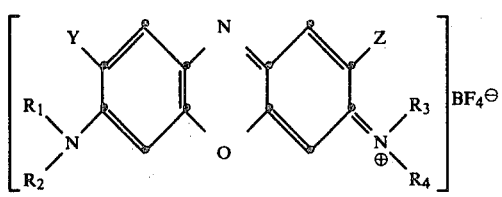

wherein $R_1$ and $R_4$ are hydrogen or alkyl, $R_2$ and $R_3$ are hydrogen, alkyl, aralkyl or aryl, and Y and Z are hydrogen, halogen, alkyl, alkoxy or a aryloxy, are most suitable for spin dyeing polymers of acrylonitrile or copolymers containing predominantly acrylonitrile.

Preferred dye salts of the formula (I) are those in which $R_1$ and $R_4$ are hydrogen or $C_1$–$C_4$alkyl, $R_2$ and $R_3$ are hydrogen, $C_1$–$C_4$alkyl, phenyl or phenyl substituted by chlorine, methyl or $C_1$–$C_2$alkoxy, and Y and Z are hydrogen, methyl or $C_1$–$C_2$alkoxy; and especially those in which $R_1$ and $R_4$ are hydrogen, $R_2$ is hydrogen, $C_1$–$C_4$alkyl, $R_3$ is phenyl or phenyl substituted by methyl, and Y and Z are hydrogen.

The novel dye salts are conveniently obtained by reacting a dye salt of the formula

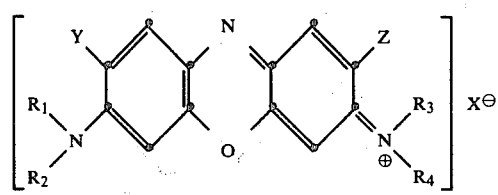

wherein X is a water-solubilising anion, in aqueous solution, with $NaBF_4$. Preferred water-solubilising anions are chlorides, bromides, sulfates, methyl sulfates or acetates. The tetrafluoroborates precipitate on account of their reluctant solubility. The starting salts are known compounds.

For use, the dye salts of this invention are conveniently dissolved in the solvent employed for dissolving the polyacrylonitrile, such as dimethyl formamide, dimethyl acetamide or dimethyl sulfoxide, and then added to the spinning solution. The mixture is homogenised and then spun in conventional manner, e.g. by the dry spinning method or by the wet spinning method, and the fibres so obtained are treated in the customary manner.

The dye salts of the invention have very good solubility in the specified solvents even at room temperature, so that they can also advantageously be used in the form of concentrated solutions containing about 5 to 40% of dye. The solubility of the dyes can be further substantially increased by raising the temperature. In addition, the dye salts have high colour strength on account of the relatively small anion—a property which permits economical dyeing.

Besides the polymers of acrylonitrile, suitable substrates are copolymers of acrylonitrile with other vinyl compounds, e.g. with vinyl chloride, vinyl fluoride, vinylidene chloride, vinyl acetate or vinyl propionate, vinyl pyridine, vinyl imidazole, vinyl pyrrolidone, vinyl alcohol, acrylates, methacrylates or acrylamides, which copolymers must contain at least 70% by weight of acrylonitrile and also acid groups which have been introduced into the polymer as end groups by means of a catalyst or have been introduced or grafted by comonomers containing such acid groups.

The process of this invention gives completely transparent, clean spinning solutions which cause no clogging or mechanical wear and tear of the spinnerets. The spun filaments and fibres obtained show no tendency to dulling as a resut of the substantially molecular dispersion of the dyes of this invention in contrast to most of the pigment dyes used at the present time. Further, the materials coloured with the dyes of this invention by the process of the invention have very good wetfastness properties. The fibres obtained also have extremely good fastness to rubbing owing to the absence of dye aggregates on the surface of the fibres such as can occur in spin dyeing with pigment dyes. In addition, the excellent fastness to thermofixation, steaming, washing and light also merits special mention.

As the tetrafluoroborate dye salts employed in the practice of this invention can be very readily precipitated in coarse-crystalline form and substantially salt-free from the aqueous solutions obtained in the synthesis, the use of spinning solutions which contain these dyes has the particular advantage that inorganic accompanying salts in the aprotic solvents employed as spinning dope do not first have to be isolated before spinning, so that, in particular, additional process steps are avoided. The extremely low water-solubility of the dye salts of the invention is a further advantage in view of the bleeding of the dye salt in the aqueous precipitation bath.

The invention is further illustrated by the following Examples.

EXAMPLE 1

40 g of the dye of the formula (X=Cl)

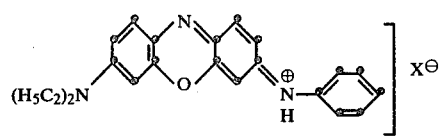

are dissolved in 800 ml of aqueous acetic acid and to this solution is added a solution of 12 g of sodium tetrafluoroborate in 50 ml of water. The precipitated dye ($X=BF_4$) is isolated by filtration, washed thoroughly with water and dried, affording 35 g of a dark powder which dyes polyacrylonitrile in the spinning solution in a pure blue shade.

EXAMPLES 2 to 9

The following table lists further dye salts which are obtained by reacting the dye salts of column 2 with sodium tetrafluoroborate in accordance with the particulars of Example 1. Pure blue dyeings are also obtained with these dye salts.

TABLE

| Example | Cation | Anion |
|---|---|---|
| 2 | (C₂H₅)₂N—[phenoxazine]—N(C₂H₅)₂⊕ | Cl⊖ |
| 3 | CH₃, (CH₃)₂N—[phenoxazine]—CH₃, NH₂⊕ | Cl⊖ |
| 4 | OCH₃, (CH₃)₂N—[phenoxazine]—NH₂⊕ | Cl⊖ |
| 5 | (C₂H₅)₂N—[phenoxazine]—CH₃, N⊕H—phenyl | Br⊖ |
| 6 | CH₃, C₂H₅HN—[phenoxazine]—N(CH₃)₂⊕ | CH₃COO⊖ |
| 7 | C₂H₅HN—[phenoxazine]—N(C₂H₅)₂⊕ | CH₃COO⊖ |
| 8 | CH₃, C₂H₅HN—[phenoxazine]—CH₃, N⊕H—phenyl | Cl⊖ |
| 9 | CH₃, H₂N—[phenoxazine]—CH₃, N⊕H—CH₃—phenyl | CH₃COO⊖ |

EXAMPLE 10

To 100 parts of a 30% solution of acid modified polyacrylonitrile in dimethyl formamide are added 5 parts of a 5% solution of the dye salt obtained in Example 1 in dimethyl formamide. The spinning solution is homogenised and spun by a dry spinning process known and commonly employed in the art. The filaments obtained are dyed a strong, blue shade and additionally have a high gloss. The fastness properties, especially the lightfastness, rub fastness, fastness to thermofixation, washfastness and fastness to steaming, are exceptionally good.

Coloured filaments of equally good properties are obtained by a wet spinning process commonly employed in the art. The precipitation and drawing baths are only stained to an extremely insignificant extent.

Strong blue dyeings of excellent fastness properties are also obtained by using the dyes listed in Examples 2-9 of the table instead of the dye employed in this Example.

What is claimed is:

1. A dye salt of the formula

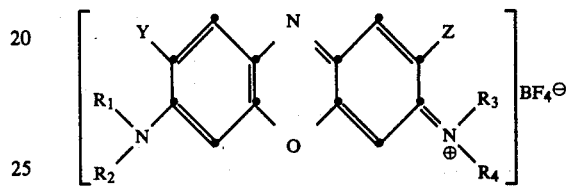

wherein $R_1$ and $R_4$ are hydrogen or alkyl, $R_2$ and $R_3$ are hydrogen, alkyl, aralkyl or aryl, and Y and Z are hydrogen, halogen, alkyl, alkoxy or aryloxy.

2. A dye salt according to claim 1, wherein $R_1$ and $R_4$ are hydrogen or $C_1$-$C_4$alkyl, $R_2$ and $R_3$ are hydrogen, $C_1$-$C_4$alkyl, phenyl or phenyl substituted by chlorine, methyl or $C_1$-$C_2$alkoxy, and Y and Z are hydrogen, methyl or $C_1$-$C_2$alkoxy.

3. A dye salt according to claim 1, wherein $R_1$ and $R_4$ are hydrogen, $R_2$ is hydrogen or $C_1$-$C_4$alkyl, $R_3$ is phenyl or phenyl substituted by methyl, and Y and Z are hydrogen.

4. The dye salt according to claim 1 of the formula

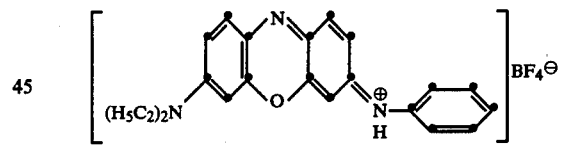

5. The dye salt according to claim 1 of the formula

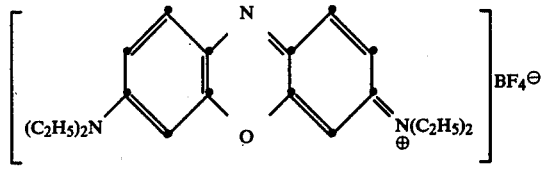

* * * * *